(12) United States Patent
Gelfand et al.

(10) Patent No.: US 10,318,617 B2
(45) Date of Patent: Jun. 11, 2019

(54) METHODS AND APPARATUS FOR EXTRACTION OF CONTENT FROM AN EMAIL OR EMAIL THREADS FOR USE IN PROVIDING IMPLICIT PROFILE ATTRIBUTES AND CONTENT FOR RECOMMENDATION ENGINES

(71) Applicant: Gartner, Inc., Stamford, CT (US)

(72) Inventors: Michael Gelfand, Rehovot (IL); Zeevi Michel, Tel Aviv (IL); Nir Polonsky, Ridgefield, CT (US)

(73) Assignee: Gartner, Inc., Stamford, CT (US)

( * ) Notice: Subject to any disclaimer, the term of this patent is extended or adjusted under 35 U.S.C. 154(b) by 268 days.

(21) Appl. No.: 14/996,329

(22) Filed: Jan. 15, 2016

(65) Prior Publication Data
US 2016/0357718 A1    Dec. 8, 2016

Related U.S. Application Data

(60) Provisional application No. 62/169,598, filed on Jun. 2, 2015.

(51) Int. Cl.
| | | |
|---|---|---|
| *G06F 17/00* | (2019.01) | |
| *G06F 17/22* | (2006.01) | |
| *H04L 12/58* | (2006.01) | |
| *G06F 17/21* | (2006.01) | |

(52) U.S. Cl.
CPC ........ *G06F 17/2264* (2013.01); *G06F 17/211* (2013.01); *G06F 17/227* (2013.01); *G06F 17/2247* (2013.01); *H04L 51/22* (2013.01); *H04L 51/063* (2013.01)

(58) Field of Classification Search
CPC .... G06F 17/22; G06F 17/211; G06F 17/2264; G06F 17/2247; H04L 12/58
See application file for complete search history.

(56) References Cited

U.S. PATENT DOCUMENTS

| | | |
|---|---|---|
| 8,244,674 B2 | 8/2012 | Davis et al. |
| 8,661,034 B2 | 2/2014 | Polonsky et al. |
| 8,918,391 B2 | 12/2014 | Polonsky et al. |
| 2003/0101153 A1* | 5/2003 | Francis ............ G06F 17/30654 706/47 |

(Continued)

*Primary Examiner* — Stephen S Hong
*Assistant Examiner* — Marshon L Robinson
(74) *Attorney, Agent, or Firm* — Lipsitz & McAllister, LLC

(57) ABSTRACT

Methods and apparatus for extracting content from an email or email thread are provided. Any replied content is removed from the email based on at least one of known delimiters and known email thread patterns used for separating original and reply emails. Any signature content is removed based on at least one of generated signature patterns for the sender and known signature patterns. Any greeting content is removed based on at least one of generated greeting patterns for the recipient and known greeting patterns. Any sent from content identifying a device or an email client from which the email was sent is removed based on known sent from content. The remaining email text can then be output for further processing, such as analyzing the text for use in augmenting a sender's implicit profile, and analyzing the text for question or answer content on specific topics.

32 Claims, 8 Drawing Sheets

(56) References Cited

U.S. PATENT DOCUMENTS

| | | | |
|---|---|---|---|
| 2004/0003402 A1* | 1/2004 | McKenna, Jr. | G06F 3/0481 725/46 |
| 2004/0221062 A1* | 11/2004 | Starbuck | G06Q 10/107 709/246 |
| 2007/0130263 A1* | 6/2007 | Li | G06Q 10/107 709/206 |
| 2008/0162651 A1* | 7/2008 | Madnani | G06Q 10/107 709/206 |
| 2010/0011076 A1* | 1/2010 | Shkolnikov | H04L 51/066 709/206 |
| 2010/0179961 A1* | 7/2010 | Berry | G06Q 10/107 707/769 |
| 2010/0198812 A1* | 8/2010 | Athsani | H04W 4/029 707/722 |
| 2010/0198869 A1* | 8/2010 | Kalaboukis | G06F 17/30867 707/770 |
| 2011/0179061 A1* | 7/2011 | Chilakamarri | G06Q 10/00 707/769 |
| 2011/0191311 A1 | 8/2011 | Polonsky et al. | |
| 2011/0295612 A1 | 12/2011 | Donneau-Golencer et al. | |
| 2014/0095319 A1* | 4/2014 | Bruns | G06Q 50/01 705/14.66 |
| 2014/0108395 A1 | 4/2014 | Polonsky et al. | |
| 2014/0214995 A1* | 7/2014 | Zlatokrilov | G06Q 10/107 709/206 |
| 2014/0257890 A1 | 9/2014 | Polonsky et al. | |
| 2015/0046435 A1 | 2/2015 | Donneau-Golencer | |
| 2015/0058380 A1 | 2/2015 | Polonsky et al. | |
| 2016/0337295 A1* | 11/2016 | Bennett | H04L 51/18 |
| 2016/0342660 A1 | 11/2016 | Polonsky et al. | |
| 2017/0171127 A1* | 6/2017 | Madnani | H04L 51/12 |

\* cited by examiner

METHODS AND APPARATUS FOR EXTRACTION OF CONTENT FROM AN EMAIL OR EMAIL THREADS FOR USE IN PROVIDING IMPLICIT PROFILE ATTRIBUTES AND CONTENT FOR RECOMMENDATION ENGINES

This application claims the benefit of U.S. provisional patent application No. 62/169,598 filed on Jun. 2, 2015, which is incorporated herein and made a part hereof by reference.

BACKGROUND OF THE INVENTION

The present invention relates to the field of item and peer recommendation algorithms directed towards industry professionals. More specifically, the present invention relates to methods and apparatus for extracting relevant content from email messages and email threads and using the extracted content in a system for recommending items and/or experts. The extracted content can be used to augment a user's implicit profile or stored in the recommendation engine database as question and/or answer content relating to a particular topic or topics, which database is accessible by the recommendation engine in response to future queries.

Document and expert recommendation systems are well-known. Most such systems employ a profile database which stores an explicit profile of each of the users of the system. An explicit profile may include information that generally defines the user based on the user's direct input into the system. Such information is usually derived from registration forms where the user has input his industry experience, job titles and duty descriptions, size of company, company name, projects he is working on, vendors he is working with, etc. Recommendation systems (also referred to herein as recommendation engines) of the type developed by Gartner, Inc. and Senexx, Inc. use not only an explicit profile of the user but also an implicit profile of the user, which is derived from a user's behavior, for example from tracking a user's actions on one or more electronic devices and/or on the web site used to access the recommendation engine. An example of an implicit profile is discussed in U.S. application Ser. No. 14/533,398 entitled Implicit Profile for Use With Recommendation Engine and/or Question Router, owned by Gartner, Inc., which is incorporated herein and made a part hereof for all purposes.

A business user's most common mode of communication is email. Hence email often encompasses the full spectrum of a typical business user's activities and provides a current and frequent reflection of these activities. Consequentially, email messages contain valuable information relating to the author's skills, background, current interests, specialties, and current activities.

Thus, information derived from emails may be quite valuable in keeping the implicit profile of the user (sender or email author) current and complete.

In addition, email is often used to share information and to answer questions, hence generating "content" that may be stored and later used by a recommendation engine.

However, the email "content" is typically shared only with the recipients of the email, may need to be stringed together from multiple emails written by multiple authors, and is only stored on the email server or the user's computer or electronic device. Thus, email content, in its current form, allows little leverage beyond the related email thread.

It would be advantageous to extract implicit profile attributes and/or question and answer content that can be stored in a database and fed into, e.g., a recommendation engine for use when a similar question arises in a forum.

The methods and apparatus of the present invention provide the foregoing and other advantages.

SUMMARY OF THE INVENTION

The present invention relates to methods and apparatus for extracting relevant text from email messages and email threads and using the extracted content in a system for recommending items and/or experts. The extracted content can be used to augment a user's implicit profile or stored in the recommendation engine database as question and/or answer content relating to a particular topic or topics, which database is accessible by the recommendation engine in response to future queries.

The typical email format creates certain obstacles that until now prevented one from systematically extracting implicit profile attributes and/or extracting question and answer content that can be stored in a database and fed into, e.g., a question router when a similar question arises in a forum. To extract such information from email messages one needs to first address these obstacles. The typical obstacles are:

1. A typical email thread contains multiple nested and "reply to" messages that if treated as one source can bias any statistical analysis (e.g., Natural Language Processing (NLP) analysis of the text or lexical analysis of the text) leading to incorrect assignment of weights to different attributes and key words (for example, a key word that is mentioned once may be counted multiple times because of the quotation of the original message in replies and nested messages and hence instead of a score of 1 will score X>>1) or leading to the extraction of a similar content multiple times. Similarly, separate but related email threads including portions of the same content may lead to the same problems;

2. The same nesting issue also makes it difficult to assign an attribute or content to a particular person in an email thread with multiple respondents that cross reference each other; and 3. In addition to the redundancy and nested nature of a typical email thread, any email message also contains a significant amount of "irrelevant content" such as greetings, signatures, device signatures, to/from information, etc. that if not flagged or removed can bias, e.g., a NLP processor.

The present invention provides a process for resolving the foregoing issues and to extract the "content" of a single email message and to parse an email thread to a flat list of its component messages (so that the content can then be extracted, correctly attributed and analyzed).

In accordance with one example embodiment of the present invention, an automated, computerized method for extracting content from an email is provided. In such a method, any replied content is removed from the email based on at least one of known delimiters and known email thread patterns used for separating original and reply emails. Any signature content is removed from the email based on at least one of generated signature patterns for the sender and known signature patterns. Any greeting content is removed from the email based on at least one of generated greeting patterns for the recipient and known greeting patterns. Any sent from content identifying a device or an email client from which the email was sent is removed based on known sent from content. The remaining email text can then be output for further processing. Such further processing may comprise at least one of: analyzing the remaining email text for use in augmenting a sender's implicit profile; and analyzing the remaining email text for question or answer content on specific topics and storing the question and answer content in a recommendation engine database.

If the email comprises HTML content, the method may further comprise, at an initial step, at least one of deleting any HTML content and converting the HTML content into corresponding text. Subsequently, once the remaining email text is obtained (after removal of the replied content, signature content, greeting content, and sent from content), the HTML content can be restored to the remaining text of the email to preserve original formatting.

The converting of the HTML content into the corresponding text may comprise removing any HTML tags or elements from the email and converting the HTML tags or elements into corresponding text or new line characters. The HTML tags or elements may be stored together with identifiers linking the HTML tags or elements to the corresponding text in a storage bank. The stored email tags or elements may be retrieved from the storage bank for use in the restoring of the HTML content to the remaining email text.

The removing of the replied content may comprise analyzing the email to determine if any of the known delimiters of replied content are present. If any of the known delimiters of replied content are present, any replied content text appearing in the email after the known delimiters is removed. The email text may also be analyzed to determine the presence of any of the known email thread patterns. If any of the known email thread patterns are present, the original email text may be extracted from the email text based on the known email thread pattern.

The known delimiters of replied content and the known email thread patterns may be stored in a storage bank for use in analyzing and removing the replied content.

In a further example embodiment of the present invention, sets of emails from corresponding users may be analyzed to determine user specific email thread patterns or styles of email thread patterns for each of the sets of emails and the corresponding users. Each of user specific email thread patterns or styles of email thread patterns may be stored as a known email thread pattern associated with the corresponding user.

The removing of the signature content may comprise generating one or more signature patterns or signature lines for a sender based on the sender name and the email text using the known signature patterns or signature line templates. The email text may then be searched to locate the one or more generated signature patterns or signature lines. A signature block can then be defined based on a located signature pattern or signature line. Then, it is determined whether text is present before the signature block. If text is present before the signature block, the signature block is removed from the email text.

The known signature patterns or signature line templates may be stored in a storage bank for use in generating the signature patterns or signature lines. Rules for defining various types of signature blocks which include definitive characteristics for each of the types of signature block may also be stored in a storage bank.

In a further example embodiment of the present invention, sets of emails from corresponding users may be analyzed to determine at least one of user specific signature patterns, user specific signature lines, and user specific signature blocks for each of the sets of emails and the corresponding users. The user specific signature patterns, user specific signature lines, and user specific signature blocks may be stored as known signature patterns, signature lines, or signature blocks for the corresponding user.

The removing of the greeting content may comprise analyzing the email text to determine the presence of any known greetings or the known greeting patterns. If any of the known greetings or known greeting patterns are present, the greeting content comprising the known greeting or the known greeting pattern is removed from the email text.

Known greetings or the known greeting patterns may be stored in a storage bank for use in analyzing and removal of the greeting content.

In a further example embodiment, the removal of the greeting content may comprise generating one or more specific greetings or greeting patterns for the recipient based on the recipient name, the email text and the known greetings or the known greeting patterns. The email text may then be searched for the generated greetings or greeting patterns. If one of the generated greetings or greeting patterns is located, the presence of a greeting block can be determined based on a located generated greeting or greeting pattern. It can then be determined whether text is present after the greeting block. If text is present after the greeting block, the greeting block is removed.

Rules defining various types of greeting blocks which include definitive characteristics for each of the types of the greeting blocks may be stored in a storage bank.

In a further example embodiment of the present invention, sets of emails from corresponding users may be analyzed to determine at least one of user specific greetings, user specific greeting patterns, and user specific greeting blocks for each of the sets of emails and the corresponding users. The user specific greetings, user specific greeting patterns, and user specific greeting blocks may be stored as known greetings, greeting patterns, and greeting blocks for the corresponding users.

The removing of the sent from content may comprise analyzing the email text to determine the presence of any of the known sent from content. If any of the known sent from content is located, all text occurring before the located sent from content is extracted for output as the remaining email text. The known sent from content may comprise one of device generated sent from content and user personalized sent from content created by a user.

The known sent from content and templates for the personalized sent from content may be stored in a storage bank for use in analyzing and removal of the sent from content.

In accordance with a further example embodiment of the present invention, the email may be part of an email thread comprised of multiple emails, reply emails, and/or forwarded emails. In such an example embodiment, the method for extracting content from an email may further comprise initially extracting the email from the email thread prior to extracting the content from the email.

The extracting of the email from the email thread may comprise analyzing the email thread to determine the presence of any of the known email thread patterns. If the email thread contains any of the known email thread patterns, the email thread may be split up into a first appearing message and a remainder of the thread. The first appearing message is then processed to remove the replied content, the signature content, the greeting content, and the sent from content as discussed above.

Once the first appearing message is split off, the sender, recipient, and date corresponding to the first appearing message can be stripped off from the remainder of the email thread so that the process can be repeated in order to extract the next appearing message from the remainder of the email thread. The process is repeated until the email thread is separated into all its component emails and each of the component emails is processed as discussed above.

The known email thread patterns may comprise at least one of standard email thread patterns for particular email clients in specific languages, and user specific email patterns determined after analysis of sets of user emails.

In accordance with another example embodiment of the present invention, the method may further comprise analyzing sets of emails for each of a plurality of users to determine at least one of user specific email thread patterns, user specific greetings, and user specific signatures. The user specific email thread patterns, the user specific greetings, and the user specific signatures may be stored in a storage bank together with a user identifier or as part of a user profile associated with a recommendation engine. The at least one of the user specific email thread patterns, the user specific greetings, and the user specific signatures may be used in the removing of the corresponding content from the email text.

The analyzing of the sets of emails to determine the user specific greetings may comprise analyzing a first line of each email from the set of emails for the user to locate all common words that appear in a percentage threshold of the emails. The first lines of the emails may then be modified by replacing any words that are not the common words with a match any word indicator. The modified first lines of the emails may be stored as the user specific greetings.

The analyzing of the sets of emails to determine the user specific signatures may comprise analyzing the set of emails for the user to locate all common lines that appear in a percentage threshold of emails. Once the common lines are determined, the emails are analyzed to locate sequences of the common lines (e.g., common lines that appear adjacent one another or above/below each other). Any of the sequences of the common lines that appear at an end of one of the emails are identified. Each distinct sequence of the common lines that appear at the end of emails are then stored as the user specific signatures.

The analyzing of the sets of emails to determine the user specific email thread patterns may comprise identifying all emails that contain either of the terms forward and reply. All of the identified emails are analyzed to locate all common line starts comprising words that appear as a first word in a line, excluding lines identified as a user specific signature. All sequences of lines containing one of the common line starts are identified. For each such identified sequence, all common words that appear in a percentage threshold of emails are identified. Each such identified sequence can then be modified by replacing all words that are not identified as one of the common words by a match any word indicator. Any of the modified sequences that appear immediately after any user specific signature pattern in a percentage threshold of the emails are stored as the user specific email thread patterns.

The sets of emails for each user may be obtained from an email source comprising at least one of a computer, a tablet computer, a laptop computer, a smartphone, an email server, an Internet enabled device, a corporate email database, an email client, and a user specific email account from an email provider, and the like.

Access to the email source may be enabled by at least one of a system administrator, a user, or via a software application running on at least one of the computer, the tablet computer, the laptop computer, the smartphone, the Internet enabled device, and the like.

The sender's implicit profile may comprise user-related information derived by tracking the user's behavior on at least one of one or more electronic devices, an electronic communications network, a website used to access a recommendation engine, and the like. The user-related information derived from the user behavior can then be analyzed to extract or derive key words therefrom which are used to characterize user interests, expertise, skills, and the like. The key words are then stored in a profiles database of the recommendation engine as the implicit profile.

The augmenting of the sender's implicit profile may comprise applying natural language processing to the remaining email text to identify a specific concept or topic, applying a weighting to the concept or topic, storing the weighted concept or topic in the sender's implicit profile, and the like.

In addition, an expertise score may be assigned to at least one of the sender and a recipient in relation to the weighted concept or topic.

The analyzing of the remaining email text for question and answer content may comprise applying natural language processing to the remaining email text to classify the remaining email text as a question or an answer on a specific concept or topic. Related questions and answers can then be linked. The linked questions and answers may be stored in the recommendation engine database for use by the recommendation engine.

The present invention also encompasses a computerized system for extracting content from an email. In an example embodiment, the system may comprise a computer processor running an email accumulation software application which is enabled to access stored user emails; an email account management module adapted to receive the stored user emails from the email accumulation software application; a self-learning module in communication with the email account management module for analyzing the user emails to determine at least one of user specific email thread patterns, user specific greetings, and user specific signatures; a storage bank for storing the user specific email thread patterns, the user specific greetings, and the user specific signatures together with a user identifier or as part of a user profile associated with a recommendation engine; and an email extraction module adapted for processing each of the emails.

The processing may comprise removing any replied content from the email based on at least one of known delimiters for separating original and reply emails, known email thread patterns, and user specific email thread patterns; removing any signature content from the email based on at least one of generated signature patterns for the sender, known signature patterns, and user specific signatures; removing any greeting content from the email based on at least one of generated greeting patterns for the sender, known greeting patterns, and user specific greetings; removing any sent from content identifying a device or an email client from which the email was sent based on known sent from content; and outputting remaining email text for further processing.

The further processing may comprise at least one of: analyzing the remaining email text for use in augmenting a sender's implicit profile, and analyzing the remaining email text for question or answer content on specific topics and storing the question and answer content in a recommendation engine database.

The email accumulation software application may be running on an email source comprising at least one of a computer, a tablet computer, a laptop computer, a smartphone, an email server, an Internet enabled device, a corporate email database, an email client, a user specific email account from an email provider, and the like.

The system may include other features and functionality as described above in connection with the example method embodiments.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
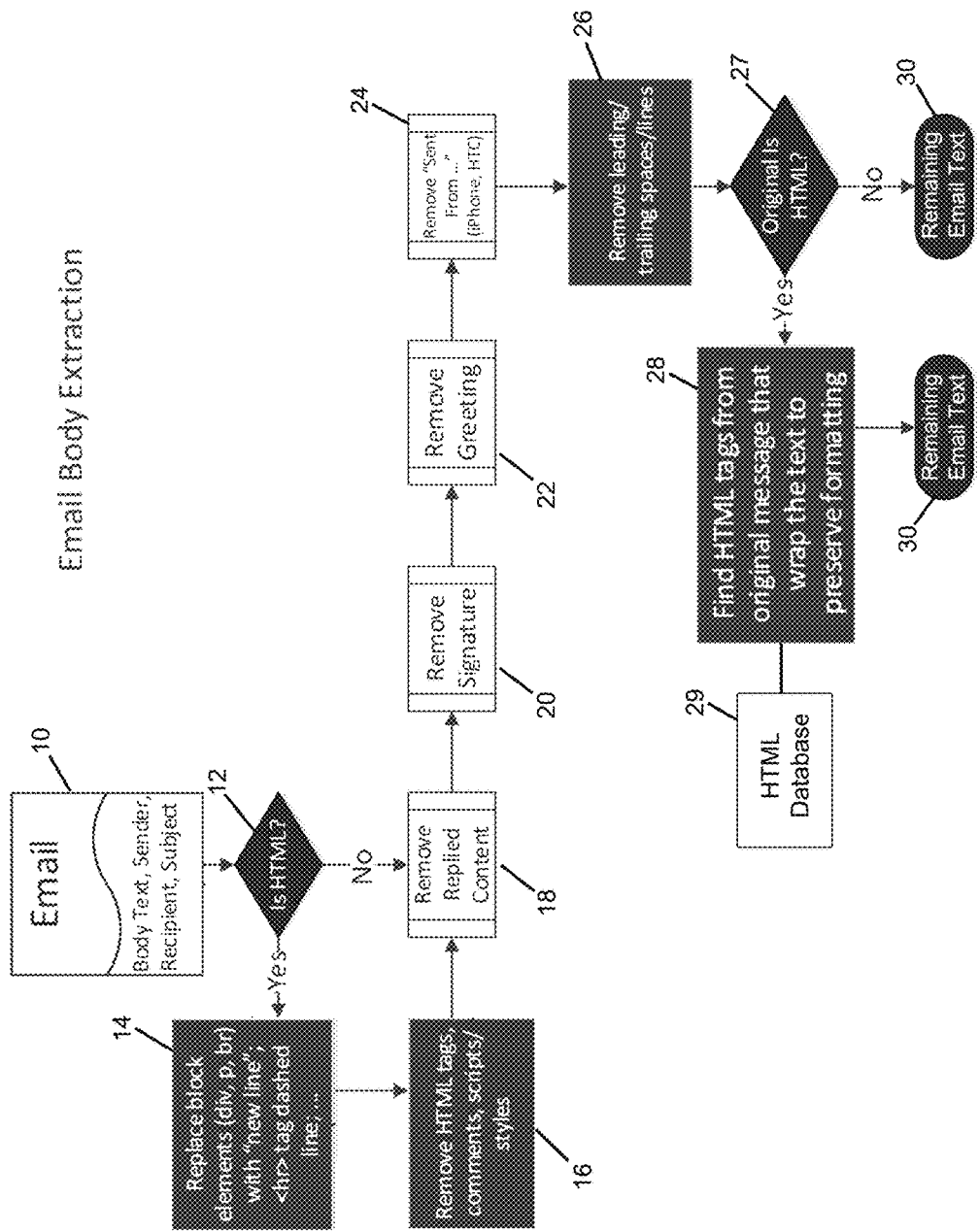
FIG. 1 shows a flow chart of an example embodiment of an email body extraction process in accordance with the present invention.

FIG. 1 illustrates an example embodiment of a process for extracting relevant text (the "email body") from an email 10. A typical email message 10 may include sender information, recipient information, a subject line, a greeting, message body content, user signature content, device signature content, or the like. Depending on the format, the email message may also include HTML content. A first step in the process is determining (12) whether the email message contains HTML content. If so, all HTML block elements, such as div, p, br, and the like, are removed and replaced with a "new line" character (14). Other HTML tags can be removed and replaced with other characters or text (e.g., the hr tag can be replaced with dashed lines or the like). Then, any HTML tags, comments, scripts, styles and the like are also removed (16), thus converting the HTML email to straight text. Once an HTML email message is converted to text, or if the email message was not an HTML email, the email can be processed to remove "replied content" (18), remove "signature content" (20), remove "greeting content" (22), and remove "sent from" or "device signature content" 24 from the text.

The removal of the various content is described in greater detail below in connection with FIGS. 2-5.

Once the non-relevant content is removed from the email message, the message body content remains. At this stage, any leading or trailing spaces or empty lines can be removed (26) from the message body content. It is then determined (27) whether the original email contained HTML content. If the original email message was an HTML message, the message body content can now be converted (28) back into HTML to preserve formatting. In this step, any of the HTML tags from the original message that were removed at the beginning of the process and that relate to the remaining message body text can then be used to wrap the message body text to preserve its original formatting. For this purpose, when the HTML email message is originally converted to text, any HTML tags and other HTML content that were removed can be stored in a database 29 with identifiers linking it to the original text content of the original email.

As used herein, the terms "storage bank" and "database" are meant to connote any type of data storage system or device, including but not limited to standard databases, memory components, hard drives, hard disks, portable memory devices, data files, data folders, Excel spreadsheets, any other type of data source or storage device, or the like.

The HTML content (if original email was HTML) or message body text content in text form (also referred to herein as "remaining email text") is then output (30) for further processing for use by the recommendation engine in updating the user profile(s) and/or stored as question and answer content, as described in greater detail below.

Figure 2:
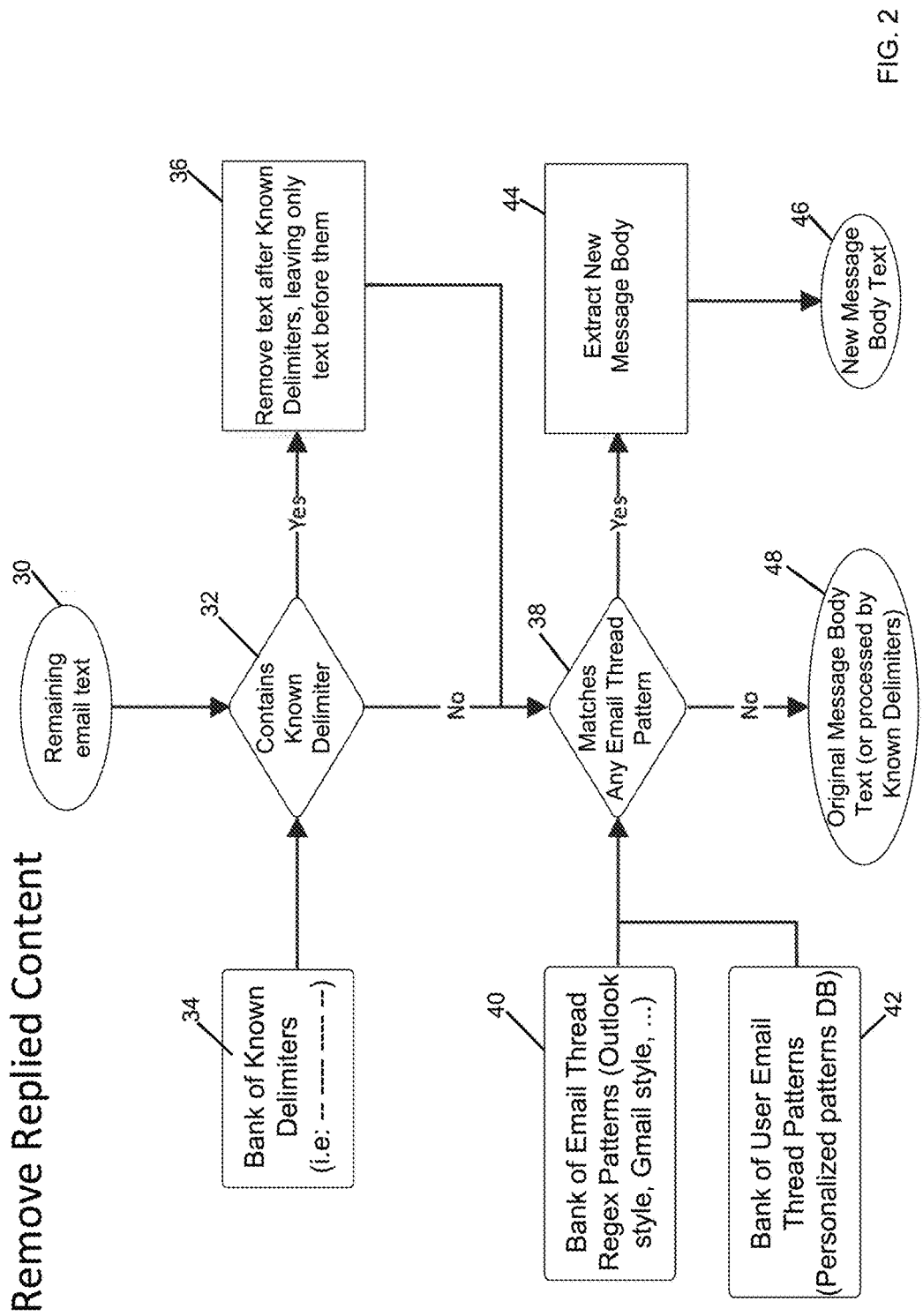
FIG. 2 shows a flow chart of an example embodiment of a sub-process for removal of replied content in accordance with the present invention.

FIG. 2 illustrates an example embodiment of the sub-process for removal of replied content from the remaining email text 30 in accordance with the present invention. If the email message does not contain HTML, or once the HTML content is converted to text, the remaining email body text 30 is then processed to remove replied content (i.e., any content in a reply to an original email). First, the email body text is analyzed (32) to determine if it contains any known delimiters of replied content. A storage bank (database) 34 of known delimiters may be used for this purpose and may include any type of content that is used to separate reply text from the original message, such as a line, a dashed line, or other text or characters used for separating reply content from original message content, and the like. Any text after such known delimiters is removed (36) and the new message body is output for further processing (e.g., for removal of email text from an email thread if known email thread patterns are located or described below, or for removal of signature content as described in connection with FIG. 3).

After analyzing whether any known delimiters are present and removing any text after the known delimiters, the email body text is analyzed (38) to determine if it matches any known email thread patterns. A storage bank (database) 40 of known email thread patterns may be used for this purpose and may include any known email thread patterns, for example those used by Outlook, Gmail, Yahoo, Hotmail, Thunderbird, or any other email client, also taking into consideration specific email thread patterns for specific languages. In addition, the present invention may include a self-learning process whereby a specific user's typical email thread pattern(s), or style of email thread pattern(s), is determined over time and stored in a storage bank 42 of user specific email thread patterns. An example embodiment of a self-learning process in accordance with the present invention is described in detail below in connection with FIG. 7.

If the email body text matches any known email thread patterns or user specific email thread patterns, the original email text is then extracted (44) from the email body text and output (46) for further processing as the new message body text.

If no known delimiters and no known email thread patterns are present, it is determined that no replied content is present and the original message body text is passed through (48) for further processing. In the event that known delimiters are present but known email thread patterns are not located, the original message body text is passed through and output (48) after removal of the text after the known delimiters.

Figure 3:
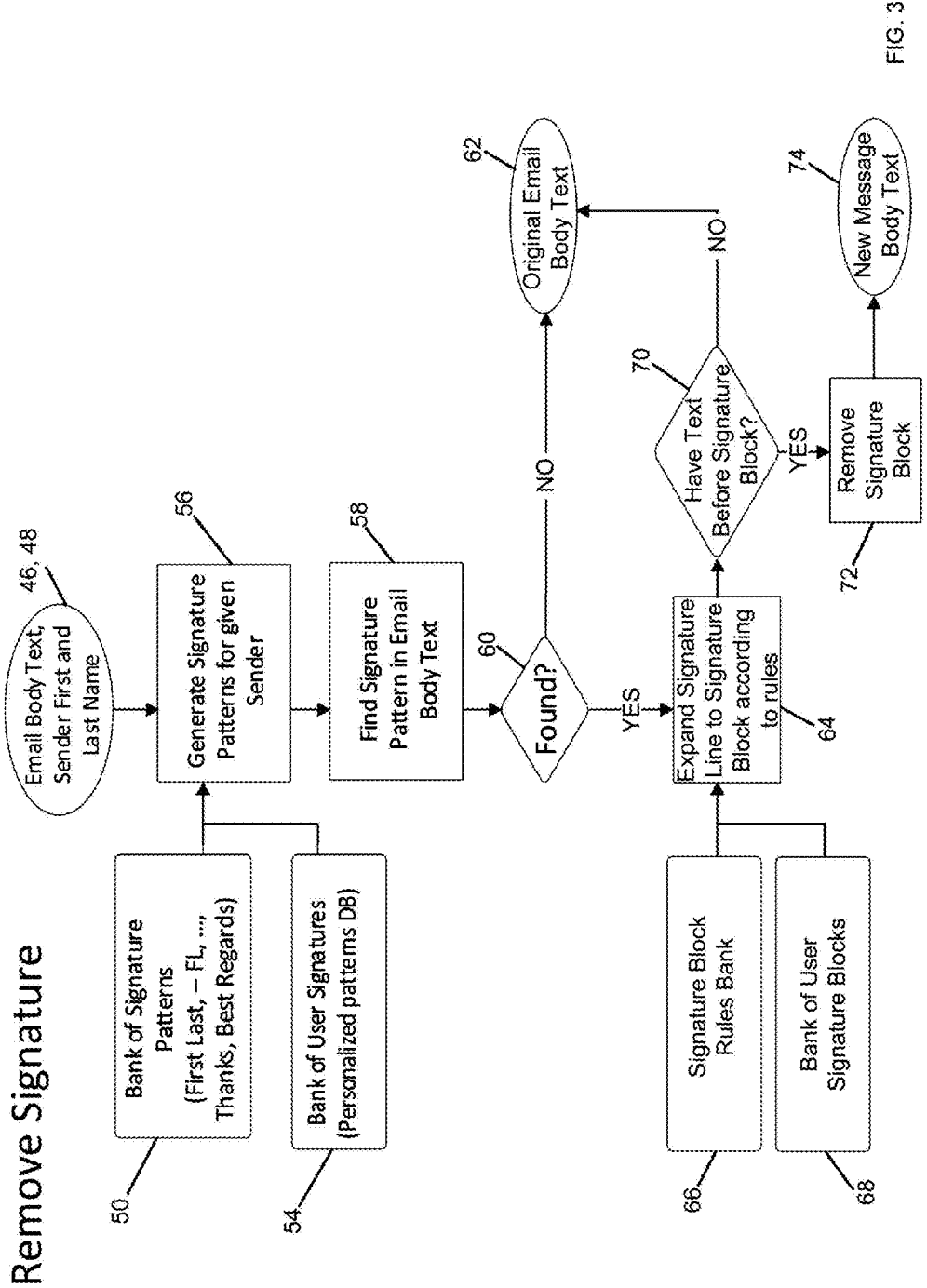
FIG. 3 shows a flow chart of an example embodiment of a sub-process for removal of signature content in accordance with the present invention.

Once the replied content is removed or it is determined that no such replied content is present, the signature content can be removed. FIG. 3 illustrates an example embodiment of the sub-process for removal of signature content in accordance with the present invention. In FIG. 3, the email body text from the prior processing step shown in FIG. 2 (whether the original message body text 48 or new message body text 46 after removal of replied content), is analyzed to determine the presence of signature content. A storage bank (database) 50 of known signature patterns may be used for this purpose and include known signature pattern templates, such as, for example, first name, first and last name, closing words (such as regards, sincerely, thanks, etc.), address, telephone number, email address, web address, social network profile information, and the like. In addition, the present invention may include a self-learning process whereby a specific user's signature line(s), pattern(s), signature style, is determined over time and stored in a storage bank 54 of user specific signature patterns, as discussed in detail below in connection with FIG. 7.

Using the email body text 46, 48 as well as the sender first and last name, a signature pattern or signature line (or multiple variants of possible signature patterns/lines) can then be generated (56) for a given sender based on the bank of signature pattern/line templates. The email body text can then be searched (58) for the generated signature pattern/lines, user specific signature patterns/lines, and variants thereof and a determination (60) made as to the presence of a signature, signature pattern, or signature line.

If the generated signature pattern/line is not found, it is determined that no signature is present and the email body text is output (62) as original email body text for further processing.

If a signature pattern/line is found, the location surrounding the signature pattern/line can be expanded (64) to include a signature block, based on rules stored in a corresponding rules bank (database) 66 defining signature blocks. These rules may include definitive characteristics of signature blocks, such as providing at least one empty line before the block, establishing the signature block as the last text block in the email body, providing a limit on the number of characters or lines in the signature line or block as a whole, and the like. In addition, the present invention may include a self-learning process whereby a specific user's signature block(s) is determined over time and stored in a storage bank 68 of user specific signature patterns, as discussed in detail below in connection with FIG. 7.

Once the signature block is defined, it is then determined (70) whether there is text before it or not. If there is text before the signature block, the signature block is removed (72) and the remaining text is output (74) as new message body text for further processing. If there is no text before the signature block, the email body text is output (62) as original email body text for further processing.

Figure 4:
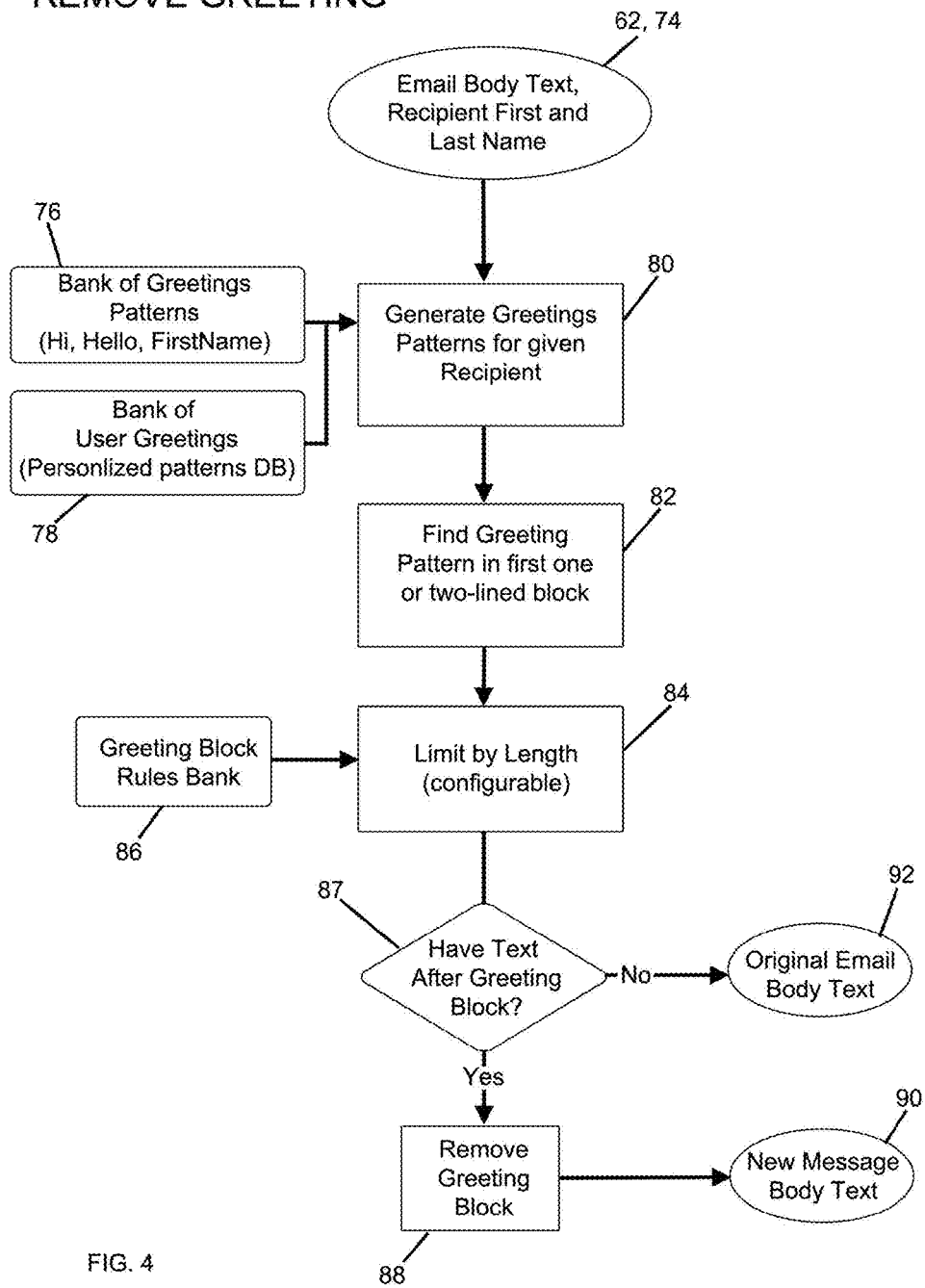
FIG. 4 shows a flow chart of an example embodiment of a sub-process for removal of greeting content in accordance with the present invention.

FIG. 4 illustrates an example embodiment of the sub-process for removal of greeting content in accordance with the present invention. The email body text (whether the original email body text 62 or the new message body text 74) is then analyzed for the presence of any greeting content. A storage bank (database) 76 of known greetings and/or greeting patterns may be used for this purpose and include any known greeting, such as Hi, Hello, first name, first and last name, Dear, and the like. In addition, the present invention may include a self-learning process whereby a specific user's greeting, greeting pattern(s), greeting style, or greeting block is determined over time and stored in a storage bank 78 of user specific greeting patterns, as discussed in detail below in connection with FIG. 7.

Using the email body text 62, 74 and the recipient's first and last names, a greeting or greeting patterns (or several possible variants of a greeting or a greeting pattern) can be generated (80) based on the bank of greetings/greeting patterns 76. The email body text (or only the first one or two lines of the email body text) can then be searched (82) for the generated greeting or greeting pattern, and/or for the user specific greeting, greeting pattern, or style. Once a greeting is located, a greeting block can be defined or limited (84) by rules stored in a corresponding rules bank (database) 86 defining greeting blocks. These rules may include definitive characteristics of greeting blocks, such as a unit of length, for example a number of characters, which may be configurable or based on the signature generation process. The email can then be examined to determine (87) if any text is present after the greeting block. If text is located after the greeting block, the greeting block can be removed (88) and the remaining text is output (90) as new message body text for further processing.

If there is no text after the greeting block, the email body text is output (92) as original email body text for further processing.

Figure 5:
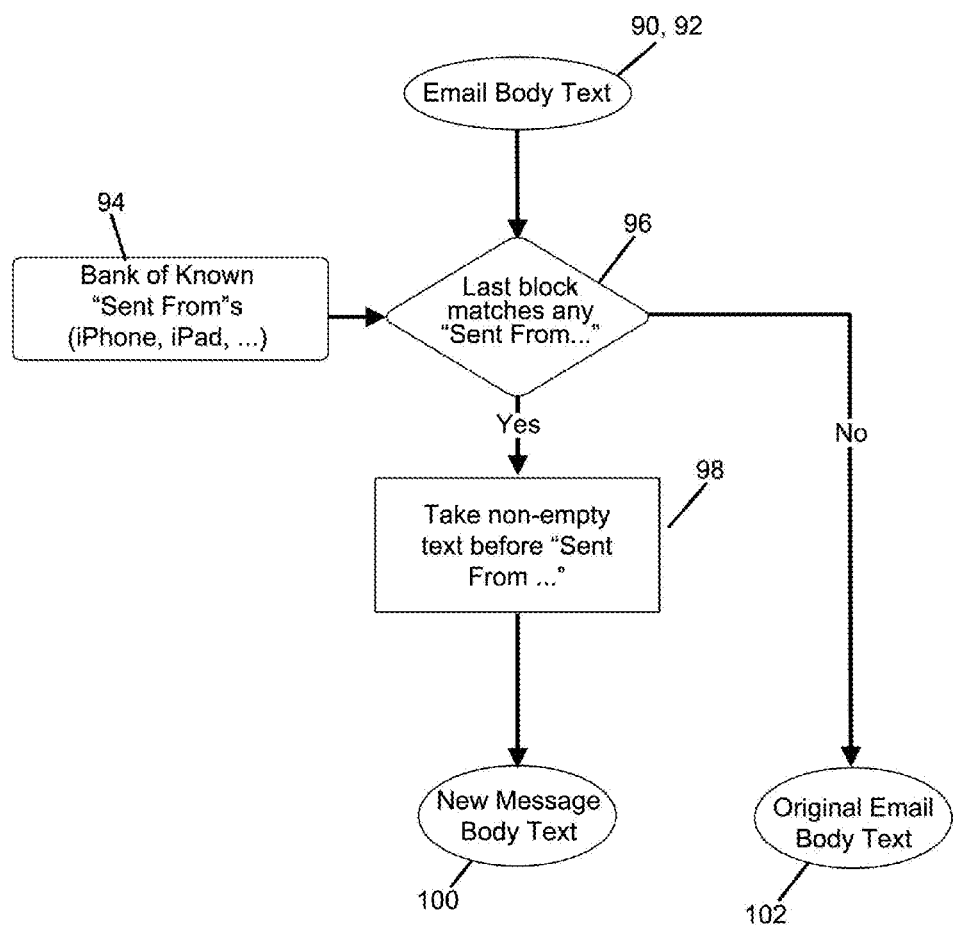
FIG. 5 shows a flow chart of an example embodiment of a sub-process for removal of sent from content in accordance with the present invention.

FIG. 5 illustrates an example embodiment of a sub-process for removal of device signature content or "sent from" content in accordance with the present invention. Such "sent from" content is any type of automatically inserted content identifying the user device, email client, or the like from which the email was sent. The email body text (90, 92) is analyzed to determine if any sent from content is contained therein. A storage bank (database) 94 of known types of sent from content may be provided for this purpose and include known sent from content generated by a user device such as "sent from my Iphone", "sent from my Ipad", "sent from my Android device", "sent using Hotmail", as well as templates for personalized sent from content, such as "sent from Tom's Iphone", and the like. Personalized sent from content can be derived from the templates and the user's name, or via analysis of the user's emails. The email message body is then analyzed (96) to determine the presence of such sent from content. As such sent from content is typically appended at the end of a sent email, it may be sufficient to search only the last two lines of an email for such content. If such sent from content is located, any text occurring before the sent from content is extracted (98) and output (100) as new message body text for further processing (as shown in FIG. 1).

If no sent from content is located, the email body text is output (102) as original email body text for further processing (as shown in FIG. 1).

It should be appreciated that at least some of the sub-processes of FIGS. 2-5 may be implemented in any order, and that the order of processing shown in FIG. 1 is an example process flow only and may be rearranged. However, rearranging the processing order may result in different steps or requirements in the sub-processes of FIGS. 2-5 depending on what content was or was not removed prior to each individual sub-process.

Emails (whether with or without multiple recipients) may generate one or more email threads each of which contains multiple emails (e.g., as a result of forwarding/replying between only selected contacts on the original email or between one of the original contacts and a new contact). In such cases, before the email body extraction process of FIG. 1 can take place, it may be necessary to extract each such email from each of the email threads for separate processing.

Figure 6:
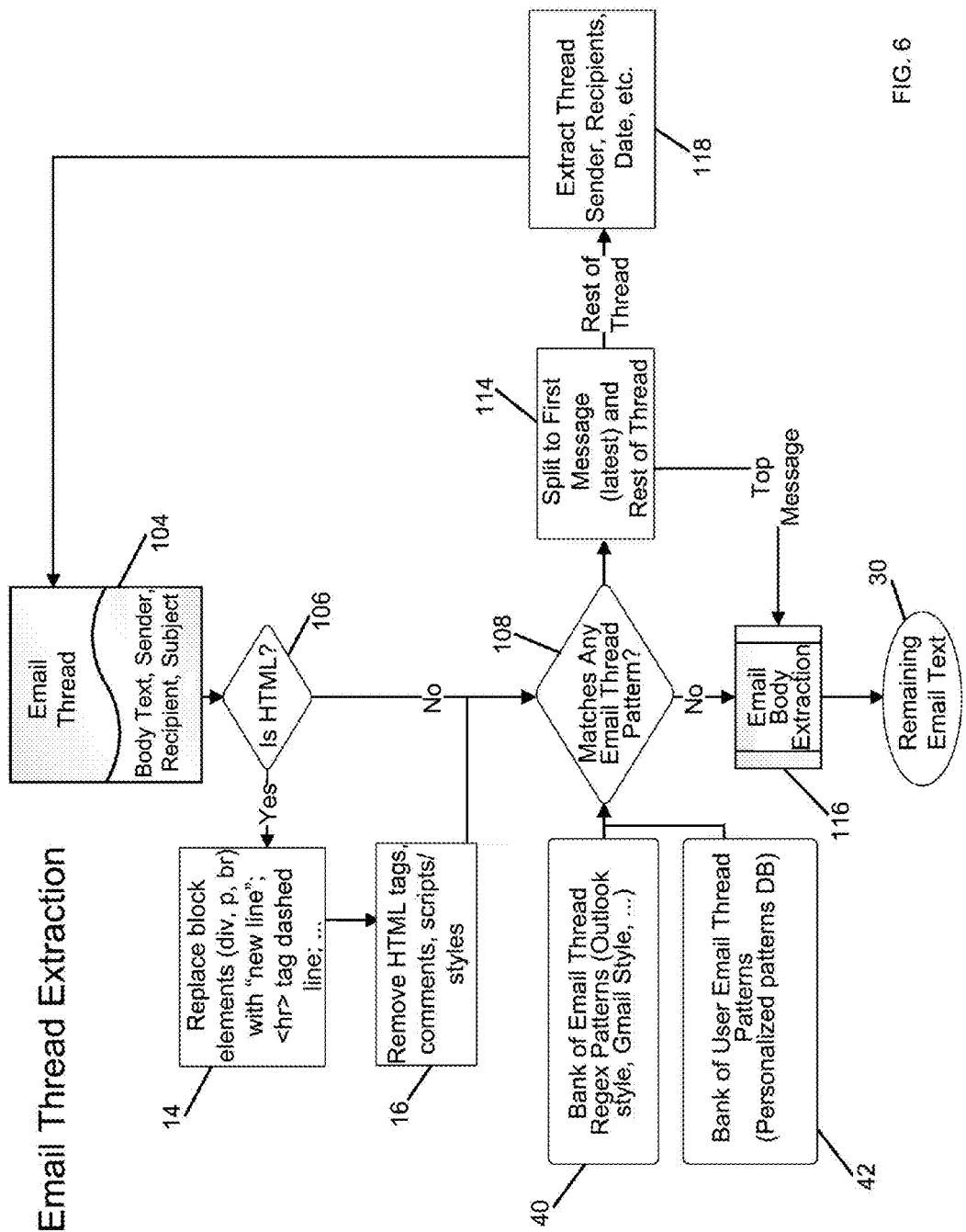
FIG. 6 shows a flow chart of an example embodiment of an email thread extraction process in accordance with the present invention.

FIG. 6 shows a flow chart of an example embodiment of an email thread extraction process in accordance with the present invention. As shown in FIG. 6, if an email thread 104 is received, the entire email thread is analyzed (106) to determine if any HTML content is present. If so, the HTML tags are removed and replaced with new lines as discussed above with regard to the corresponding steps of FIG. 1. Once the HTML content is removed, or if no HTML content is located, the email thread is analyzed (108) to determine if it matches any known email thread patterns. For this purpose, a storage bank (database) 40 of known email thread patterns is provided, which may include examples of any known email thread patterns, such as those used by Outlook, Gmail, Yahoo, Hotmail, Thunderbird, or any other email client, also taking into consideration specific email thread patterns for specific languages. As discussed above, user specific email thread patterns obtained from a self-learning process may also be stored (e.g., in storage bank 42) and used in analyzing the email thread. If the email thread contains any known or user specific email thread patterns, the email thread is split up (114) into a first appearing message in the thread and the remainder of the thread. The first appearing message is then output (116) for further processing (e.g., email body text extraction) in accordance with FIGS. 1-5.

The thread sender, recipient, and date corresponding to the first appearing message that has been split off is then stripped (118) from the remainder of the email thread, and the remainder of the email thread is then fed back into the processing loop for extraction of the next earliest message, and so on, until the message thread or threads have been completely broken down into component messages, which are then processed as discussed above in connection with FIG. 5.

If no known or user specific email thread patterns are detected, the email is then output (116) on for further processing in accordance with FIGS. 1-5.

Figure 7:
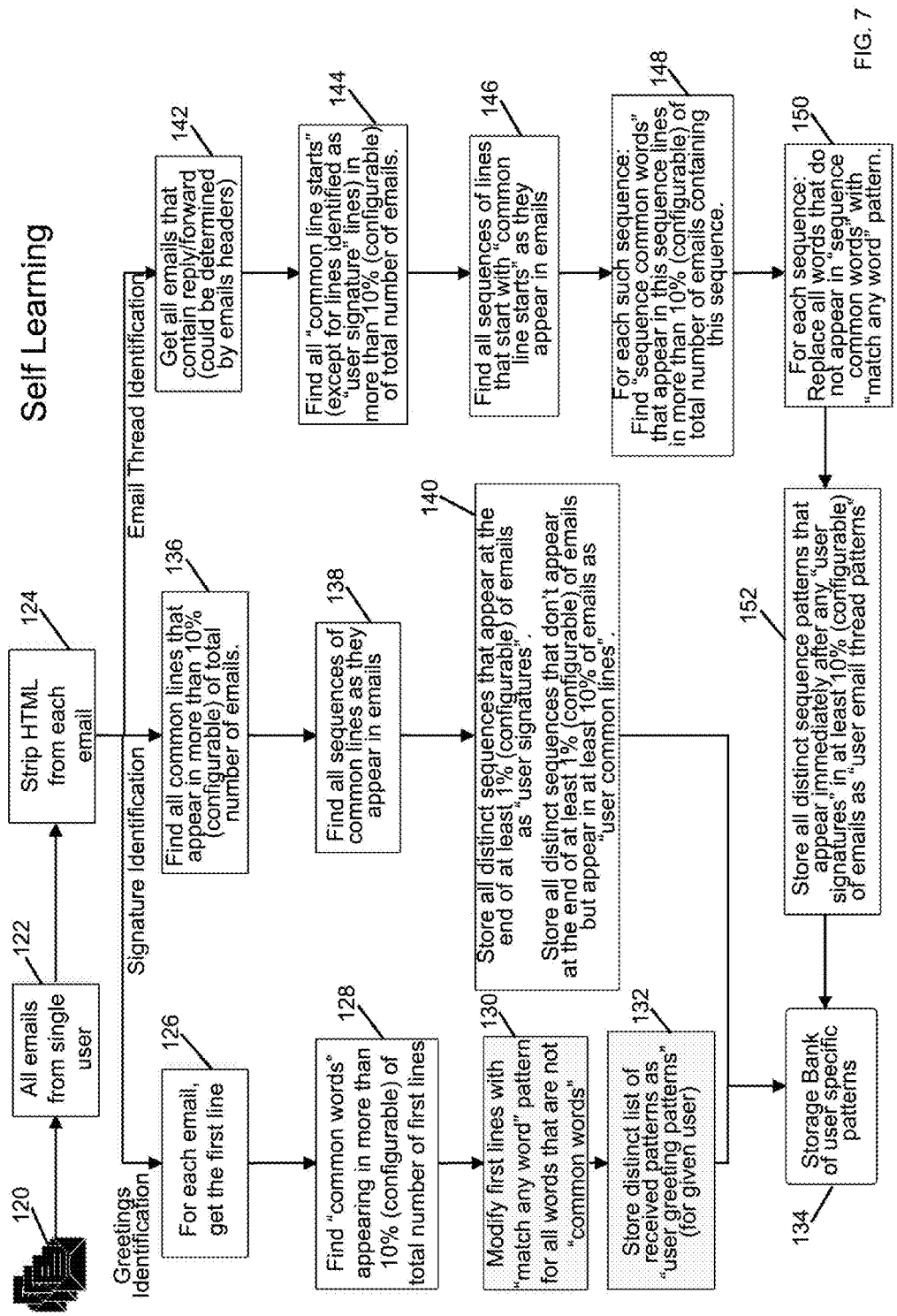
FIG. 7 shows a flow chart of an example embodiment of self-learning processes for identifying various user-specific aspects of an email from a group of user emails in accordance with the present invention.

The present invention also encompasses self-learning capabilities which enable the system to automatically detect a particular user's signature, greeting, and thread/reply patterns. For example, over time the system can learn how a particular user typically writes an email, including the user's writing style, greetings, replies, thread patterns, signature patterns, and the like. This information can be incorporated into the user's implicit profile for use by the recommendation engine. FIG. 7 shows an example embodiment of the self-learning aspect of the present invention.

As shown in FIG. 7, the system will analyze all available emails from a specific user. The emails 120 may be obtained (122) from one or more of a user computer, a user device (e.g., a laptop, tablet, smartphone, Internet enabled device, or the like.), an email client, an email server, and/or a user email account from a known email provider or from a corporate email database (in which case, for example, the emails may be filtered by the "From" header). For each such email for each specific user, the system may strip out the HTML content (124) as described above in connection with FIG. 1. This may be performed as part of the email body extraction process described above.

Once the HTML content, if present, is removed, each email may be separately analyzed for specific common greetings, signatures, and email thread patterns. For example, in determining a user specific greeting (or user specific greeting pattern), the first line of each email may be obtained (126) and analyzed (128) to locate all words (referred as common words) that appear in more than a certain percentage threshold of the first lines of the emails. The percentage threshold may be configurable (e.g., approximately 10-30%). Once one or more common words are located, the first lines of the emails will be modified (130) (if necessary) to replace any of the words that are not common words with a "match any word" pattern (e.g., "Hi Michael" and "Hi David" will both be replaced by "Hi*" or similar). The modified first lines are then stored (132) in storage bank 134 of user specific greetings. Thus, if greetings such as "Hi" or "Hello everyone" are repeatedly located, they will be stored as user specific greetings. If greetings such as "Hi David" and "Hi Mary" are located, these will be reduced to "Hi*" and "Hi*" will be stored as a user specific greeting pattern.

User specific greeting blocks may be determined by expanding the location around the user specific greeting based on rules defining characteristics of greeting blocks, as discussed above in connection with FIG. 4. The user specific greeting blocks may also be stored in storage bank 134.

In determining user specific signatures, the emails are analyzed (136) to locate all non-empty lines (referred to as common lines) that appear in more than a percentage threshold of the emails. The percentage threshold may be configurable (e.g., approximately 10-30%). All sequences of such common lines are located (138) in the emails. From these sequences, all distinct sequences of common lines that appear at the end of a percentage threshold of emails are stored (140) as user specific signatures (these may be, for example, variations of the user's name used to sign emails) in storage bank 134. The percentage threshold may be configurable (e.g., approximately 1-10%). All distinct sequences that do not appear at the end of such emails will be stored (140) as user specific common lines (these may be, for example, various informal user sign offs, such as "Regards", "Sincerely", "Best Wishes", and the like). User specific common lines may also be removed from the email content and/or used to distinguish between a user's signature and a more informal signoff.

User specific signature patterns may be determined in the same manner as described above for determining user specific greeting patterns, such as analyzing the end portion of emails for all words (referred as common words) that appear in more than a certain percentage threshold of the last few lines of the emails. The percentage threshold may be configurable (e.g., approximately 10-30%). Once one or more common words are located, the corresponding lines of the emails will be modified to replace any of the words that are not common words with a "match any word" pattern (e.g., such as "*"). For example, "John Smith, XYZ Corporation" and "Johnathan M. Smith, XYZ Corporation" will both be replaced by "*Smith, XYZ Corporation" and stored as a user specific signature pattern.

User specific signature blocks may be determined by expanding the location around the user specific signature based on rules defining characteristics of signature blocks, as discussed above in connection with FIG. 3. The user specific signature block may also be stored in storage bank 134.

In determining user specific email thread patterns (or style of email thread patterns), all emails that contain "reply" or "forward" are identified (142). These emails are analyzed (144) to locate all words (referred to as common line starts) that appear as a first word in a line (excluding lines identified as user specific signature lines) in a percentage threshold of the emails. All sequences of lines containing one of the identified common line starts are located (146). For each such sequence, all words (referred to as sequence common words) that appear in a percentage threshold of the emails are located (148). For each such sequence, all words that are not sequence common words are replaced (150) by a "match any word" pattern. Any such modified user specific sequence patterns that appear immediately after any user specific signatures in a percentage threshold of the emails are identified and stored (152) as user specific email thread patterns in storage bank 134. The percentage thresholds identified above may be configurable (e.g., approximately 10-30%). For example, the beginning of an email thread may include the following sequence:

From: John Smith
Date: Dec. 30, 2015
To: Alice Jones

Similar emails may start in the same manner (with the From, Date and To information being variable). Accordingly, an example email thread pattern may be stored as:

From: *
Date: *
To: *

Although FIG. 7 shows a single storage bank 134, the known and user specific email thread patterns, signatures, and greetings, may be stored in one or more databases, storage banks, or other type of data storage system, together with a user identifier, or may be included as part of a user profile of a recommendation engine linked to the email extraction system of the present invention.

The present invention may be implemented with a combination of hardware and software. A software application running on a computer processor may be used to analyze and process the emails. The databases described in connection with FIGS. 1-6 may be combined into a single database or comprise separate databases, which may be cloud based, on premise-based, file-based, or provided by external services, or the like.

Figure 8:
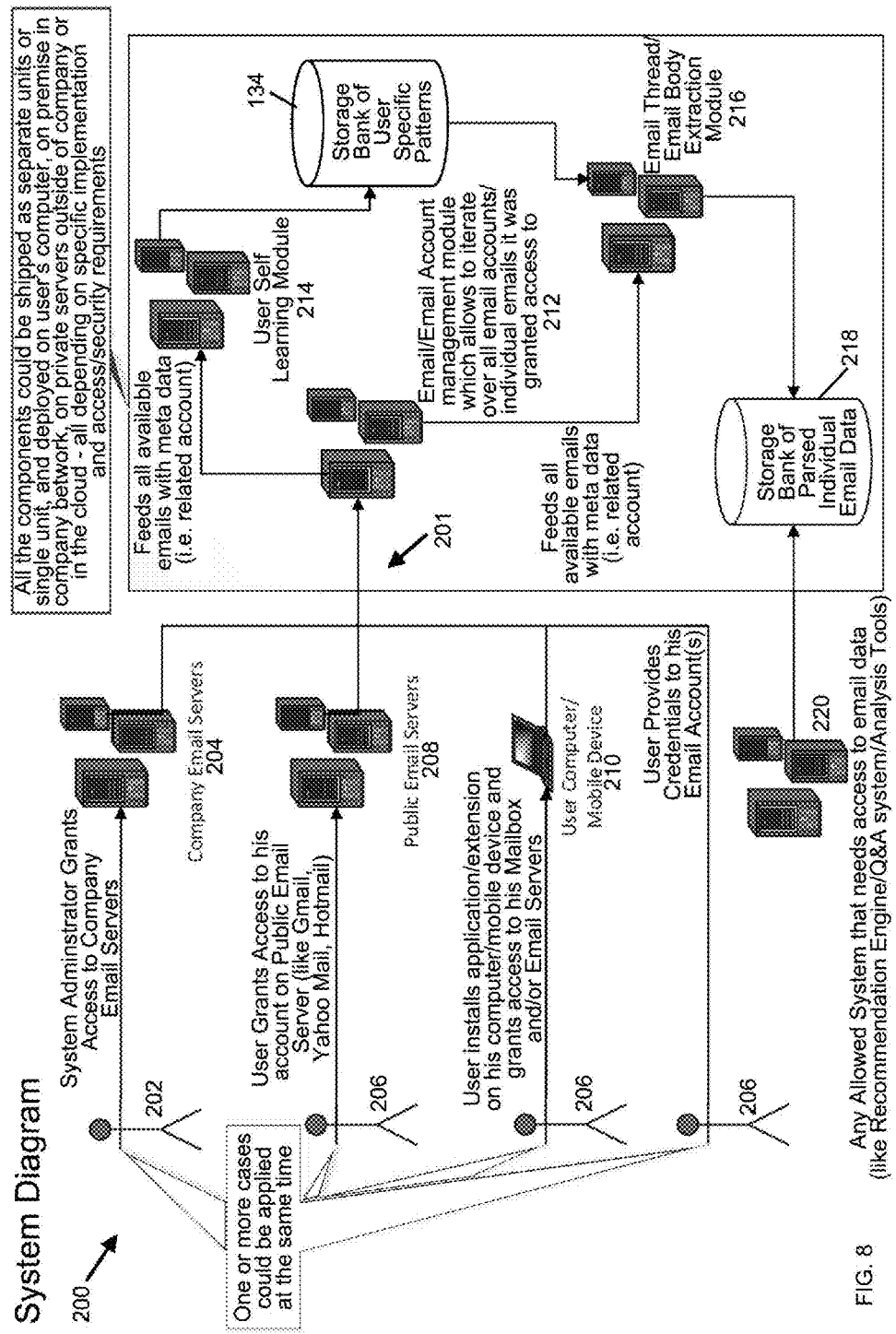
FIG. 8 shows a block diagram of an example embodiment of a system in accordance with the present invention.

FIG. 8 shows an example embodiment of a system 200 in accordance with the present invention. As shown in FIG. 8, the system may be implemented on a variety of devices and accessed/initiated in various ways. For example: a system administrator 202 may grant the system access to company email servers 204; a user 206 may grant system access to a personal or corporate email account, such as a Yahoo Mail, Gmail, or Hotmail account (e.g., maintained on public email servers 208), or to a corporate email account established under a corporate web address (e.g., maintained at servers 204); a user 206 may install an application/extension on a personal computing device 210 (e.g., computer, laptop, smartphone, tablet computer, Internet enabled device, etc.) which grants the system access to email accounts/folders maintained on such devices or accessed by such devices (e.g., the application may contain access information for accessing email servicer 204, 208); and/or a user 206 may provide the system with access credentials to the user's email account(s) (e.g., accounts maintained on public email servers 208 or company email servers 204). For example, a computer processor (e.g., in the user device 210 or in the system administrator computing device) running an email accumulation software application may be provided which is enabled to access/obtain stored user emails from various sources such as email servers 204, 208, emails stored on one or more of the user devices 210, and the like.

Once the system is provided with access to the emails, the emails for each user are accumulated and processed by an email account management module 212. The email account management module 212 may feed all available emails (together with meta data identifying or describing the email, email account or source) to a self-learning module 214 for processing of the emails to identify user specific email thread patterns, signatures, and greetings, as discussed above in connection with FIG. 7. The resulting user specific email thread patterns, signatures, and greetings may then be stored in storage bank 134 for use in the email extraction process as discussed above. The user specific thread patterns, signatures, and greetings may be stored in storage bank 134 with corresponding user identifiers and/or stored as part of a user's implicit profile in a database of a recommendation engine 220.

The email account management module 212 may also feed all available emails to an email thread/body extraction module 216 for processing of the emails as discussed above in connection with FIGS. 1-6. The data obtained from parsing of the emails may then be stored in storage bank 218 for further processing or use as discussed above (e.g., by a recommendation engine or other analysis tools 220).

The email account management module 212, the self-learning module 214, and the email thread/body extraction module 216 may each be implemented in a combination of software and hardware, including but not limited to one or more software applications running on one or more computer processors, whether located in the same or disparate locations. The system components may be deployed on a user computer or other user device (smartphone, tablet computer, or the like), within a corporate network, on private servers outside of the company, on the cloud, or at a third party location, or any combination of the foregoing, which may vary depending on security issues and access requirements of a specific company or individual. Similarly, the various databases shown in FIG. 8 may be implemented as a single database or multiple databases (or other types of data storage) located on a user device, the cloud, a central database, or the like.

The components of the system 200 may be connected by a communications network 201, such as the Internet, an intranet, a local area network a wide area network, or the like.

Access to the parsed email data may be provided to various other systems that may require use of such email data. For example, the extracted email content can be used to augment a user's implicit profile (e.g., by storing the email content or key words derived from the email content in the implicit profile maintained by the recommendation engine 220).

The implicit profile for each user may also comprise user-related information derived from tracking the user's behavior on at least one of one or more electronic devices (e.g. user device 210), an electronic communications network (e.g., network 201), a website used to access the recommendation system, and the like. The user-related information derived from the user behavior may be analyzed to extract or derive key words therefrom which may be used to characterize user interests, expertise, skills, and the like. The key words may be stored in a profiles database as the implicit profile. Additional information may be used to form the implicit profile, as explained in detail in U.S. Ser. No. 14/533,398.

For example, once extraction and parsing are performed as discussed above, concepts from the remaining email text can then be identified by executing natural language processing of the remaining content. Unique key words can be extracted and concepts or topics can be established from the extracted key words and their natural-language hierarchy. The concepts or topics can then be mapped to expertise. Relationships between key words and concept/topic hierarchy can be mapped to (assumed to exist) expertise ontology (e.g., stored in a recommendation engine database). If needed, the expertise ontology can be expanded to accommodate new concepts and topics. The key words and concepts or topics can be weighted based on the location of the source sentence in the email thread (i.e., in the root message, in a reply, in a comment on the reply, etc.). The weighted concepts and/or topics can be stored as part of the user's implicit profile in a database of the recommendation engine 220. The location weights can be merged with (assumed to exist) expertise scoring logic (e.g., from a recommendation engine database). Expertise scores can then be assigned to the concepts or topics.

Next, an expertise may be assigned to the user(s) (sender and recipients) in relation to the weighted concepts or topics. For example, expertise with a given score may be assigned to all users in the thread, or just the relevant sender of the content. Assignments and scores from multiple threads can be merged together for one or more of the users. Expertise that are below a relevance score threshold may be dropped. The remaining expertise may be compared to the user's profile (explicit and/or implicit profile) and the expertise and scoring in the user's profiles may be updated as necessary or new expertise may be added to the profile(s).

As a further example, the extracted content may be stored and later used by the recommendation engine 220. For example, once the email thread is expanded and pre-processed as discussed above to reduce the email thread to relevant text, the remaining content can then be analyzed to determine question and answer content relating to specific topics, which can be stored in a database for use by the recommendation engine 220 in response to further queries. For example, NLP concepts can be identified and used to classify content as questions or answers on a particular topic or concept; related questions and answers can be linked; linked and classified questions and answers can be stored in a staging database for later use by a recommendation engine 220, such as a question router or a similar knowledge distribution application. Thus, if the email content is analyzed to determine the presence of a question and an answer, whether in an email thread or related email threads, this Q & A content can be stored for later use by the recommendation engine.

Other uses for the extracted content may also be considered, such as determining social connections by analyzing the people each user talks to, determining the user's usual "email hours" to optimize email campaigns sent to user, and the like.

It should now be appreciated that the present invention provides advantageous methods and apparatus for extracting useful content from an email or an email thread.

Although the invention has been described in connection with various illustrated embodiments, numerous modifications and adaptations may be made thereto without departing from the spirit and scope of the invention as set forth in the claims.

What is claimed is:

1. An automated, computerized method for extracting content from an email, comprising:

removing any replied content from the email based on at least one of known delimiters and known email thread patterns used for separating original and reply emails;

analyzing the email to locate any generated signature patterns for the sender and any known signature patterns, and removing any signature content from the email based on any of the located generated signature patterns for the sender and any of the located known signature patterns;

analyzing the email to locate any generated greeting patterns for the recipient and any known greeting patterns, and removing any greeting content from the email based on any of the located generated greeting patterns for the recipient and any of the located known greeting patterns;

removing any sent from content identifying a device or an email client from which the email was sent based on known sent from content; and outputting remaining email text for further processing;

wherein said further processing comprises:

analyzing the remaining email text for use in augmenting a sender's implicit profile by deriving key words from the remaining email text and storing the key words as a part of the sender's implicit profile, the sender's implicit profile being located in a recommendation engine database; and analyzing the remaining email text for question and answer content on specific topics and storing the question and answer content in the recommendation engine database.

2. The method in accordance with claim 1, wherein, if the email comprises HTML content, further comprising:

initially at least one of deleting any HTML content and converting the HTML content into corresponding text; and restoring the HTML content to the remaining text of the email to preserve original formatting.

3. The method in accordance with claim 2, wherein the converting of the HTML content into the corresponding text comprises removing any HTML tags or elements from the email and converting the HTML tags or elements into the corresponding text or new line characters.

4. The method in accordance with claim 3, further comprising:

storing the HTML tags or elements together with identifiers linking the HTML tags or elements to the corresponding text in a storage bank; and retrieving the stored email tags or elements from the storage bank for use in the restoring of the HTML content to the remaining email text.

5. The method in accordance with claim 1, wherein the removing of the replied content comprises:

analyzing the email to determine if any of the known delimiters of replied content are present;

if any of the known delimiters of replied content are present, removing any replied content text appearing in the email after the known delimiters;

analyzing the email text to determine the presence of any of the known email thread patterns; and if any of the known email thread patterns are present, extracting original email text from the email text based on the known email thread pattern.

6. The method in accordance with claim 5, further comprising:

storing the known delimiters of replied content and the known email thread patterns in a storage bank.

7. The method in accordance with claim 5, further comprising:
   analyzing sets of emails from corresponding users;
   determining user specific email thread patterns or styles of email thread patterns for each of the sets of emails and the corresponding users; and
   storing each of the user specific email thread patterns or styles of email thread patterns as a known email thread pattern associated with the corresponding user.

8. The method in accordance with claim 1, wherein the removing of the signature content comprises:
   generating one or more signature patterns or signature lines for a sender based on the sender name and the email text using the known signature patterns or signature line templates;
   searching the email text to locate the one or more generated signature patterns or signature lines;
   defining a signature block based on a located signature pattern or signature line;
   determining whether text is present before the signature block; and
   if text is present before the signature block, removing the signature block from the email text.

9. The method in accordance with claim 8, further comprising:
   storing the known signature patterns or the signature line templates in a storage bank; and
   storing rules defining various types of signature blocks which include definitive characteristics for each of the types of signature block.

10. The method in accordance with claim 8, further comprising:
    analyzing sets of emails from corresponding users;
    determining at least one of user specific signature patterns, user specific signature lines, and user specific signature blocks for each of the sets of emails and the corresponding users; and
    storing the user specific signature patterns, user specific signature lines, and user specific signature blocks as known signature patterns, signature lines, or signature blocks for the corresponding user.

11. The method in accordance with claim 1, wherein the removing of the greeting content comprises:
    analyzing the email text to determine the presence of any known greetings or the known greeting patterns; and
    if any of the known greetings or the known greeting patterns are present, removing the greeting content comprising the known greeting or the known greeting pattern from the email text.

12. The method in accordance with claim 1, wherein the removing of the greeting content comprises:
    storing known greetings or the known greeting patterns in a storage bank;
    generating one or more specific greetings or greeting patterns for the recipient based on the recipient name, the email text and the known greetings or the known greeting patterns;
    searching the email text for the generated greetings or greeting patterns;
    if one of the generated greetings or greeting patterns is located, determining the presence of a greeting block based on a located generated greeting or greeting pattern;
    determining whether text is present after the greeting block; and
    if text is present after the greeting block, removing the greeting block.

13. The method in accordance with claim 12, further comprising:
    storing rules defining various types of greeting blocks which include definitive characteristics for each of the types of the greeting blocks.

14. The method in accordance with claim 12, further comprising:
    analyzing sets of emails from corresponding users;
    determining at least one of user specific greetings, user specific greeting patterns, and user specific greeting blocks for each of the sets of emails and the corresponding users; and
    storing the user specific greetings, user specific greeting patterns, and user specific greeting blocks as known greetings, greeting patterns, and greeting blocks for the corresponding users.

15. The method in accordance with claim 1, wherein the removing of the sent from content comprises:
    analyzing the email text to determine the presence of any of the known sent from content; and
    if any of the known sent from content is located, extracting all text occurring before the located sent from content for output as the remaining email text;
    wherein the known sent from content comprises one of device generated sent from content and personalized sent from content created by a user.

16. The method in accordance with claim 15, further comprising:
    storing the known sent from content and templates for the personalized sent from content in a storage bank.

17. The method in accordance with claim 1, wherein the email is part of an email thread comprised of multiple emails, reply emails, and/or forwarded emails, further comprising:
    initially extracting the email from the email thread prior to extracting the content from the email.

18. The method in accordance with claim 17, wherein:
    the extracting of the email from the email thread comprises:
      analyzing the email thread to determine the presence of any of the known email thread patterns; and
      if the email thread contains any of the known email thread patterns, splitting the email thread up into a first appearing message and a remainder of the thread; and
    the first appearing message is then processed to remove the replied content, the signature content, the greeting content, and the sent from content.

19. The method in accordance with claim 18, further comprising:
    stripping off the sender, recipient, and date corresponding to the first appearing message from the remainder of the email thread; and
    extracting the next appearing message from the remainder of the email thread.

20. The method in accordance with claim 18, wherein the known email thread patterns comprise at least one of standard email thread patterns for particular email clients in specific languages, and user specific email patterns determined after analysis of sets of user emails.

21. The method in accordance with claim 1, further comprising:
    analyzing sets of emails for each of a plurality of users to determine at least one of user specific email thread patterns, user specific greetings, and user specific signatures;

storing the user specific email thread patterns, the user specific greetings, and the user specific signatures in a storage bank together with a user identifier or as part of a user profile associated with a recommendation engine; and using the at least one of the user specific email thread patterns, the user specific greetings, and the user specific signatures in the removing of the corresponding content from the email text.

22. The method in accordance with claim 21, wherein the analyzing of the sets of emails to determine the user specific greetings comprises:

analyzing a first line of each email from the set of emails for the user to locate all common words that appear in a percentage threshold of the emails;

modifying the first lines of the emails by replacing any words that are not the common words with a match any word indicator; and storing the modified first lines of the emails as the user specific greetings.

23. The method in accordance with claim 21, wherein the analyzing of the sets of emails to determine the user specific signatures comprises:

analyzing the set of emails for the user to locate all common lines that appear in a percentage threshold of emails;

analyzing the set of emails to locate sequences of the common lines;

identifying any of the sequences of the common lines that appear at an end of one of the emails; and storing each of the sequences of the common lines that appear at the end of emails as the user specific signatures.

24. The method in accordance with claim 21, wherein the analyzing of the sets of emails to determine the user specific email thread patterns comprises:

identifying all emails that contain either of the terms forward and reply;

analyzing all of the identified emails to locate all common line starts comprising words that appear as a first word in a line, excluding lines identified as a user specific signature;

locating all sequences of lines containing one of the common line starts;

identifying, for each of the sequences, all common words that appear in a percentage threshold of emails;

modifying each of the identified sequence by replacing all words that are not identified as one of the common words by a match any word indicator; and storing any of the modified sequences that appear immediately after any user specific signature pattern in a percentage threshold of the emails as the user specific email thread patterns.

25. The method in accordance with claim 21, wherein the sets of emails for each user are obtained from an email source comprising at least one of a computer, a tablet computer, a laptop computer, a smartphone, an email server, an Internet enabled device, a corporate email database, an email client, and a user specific email account from an email provider.

26. The method in accordance with claim 25, further comprising:

enabling access to the email source by at least one of a system administrator, a user, or via a software application running on at least one of the computer, the tablet computer, the laptop computer, the smartphone, and the Internet enabled device.

27. The method in accordance with claim 1, wherein the sender's implicit profile comprises user-related information derived by:

tracking the user's behavior on at least one of one or more electronic devices, an electronic communications network, and a website used to access a recommendation engine;

analyzing the user-related information derived from the user behavior to extract or derive key words therefrom which are used to characterize user interests, expertise, and skills; and storing the key words in the recommendation engine database as the implicit profile.

28. The method in accordance with claim 1, wherein the augmenting of the sender's implicit profile further comprises:

applying natural language processing to the remaining email text to identify a specific concept or topic;

applying a weighting to the concept or topic; and storing the weighted concept or topic in the sender's implicit profile.

29. The method in accordance with claim 28, further comprising assigning an expertise score to at least one of the sender and a recipient in relation to the weighted concept or topic.

30. The method in accordance with claim 1, wherein the analyzing of the remaining email text for question and answer content comprises:

applying natural language processing to the remaining email text to classify the remaining email text as a question or an answer on a specific concept or topic;

linking related questions and answers; and storing the linked questions and answers in the recommendation engine database for use by the recommendation engine.

31. A computerized system for extracting content from an email, comprising:

a computer processor running an email accumulation software application which is enabled to access stored user emails;

an email account management module adapted to receive the stored user emails from the email accumulation software application;

a self-learning module in communication with the email account management module for analyzing the user emails to determine at least one of user specific email thread patterns, user specific greetings, and user specific signatures;

a storage bank for storing the user specific email thread patterns, the user specific greetings, and the user specific signatures together with a user identifier or as part of a user profile associated with a recommendation engine; and an email extraction module adapted for processing each of the emails, said processing comprising:

removing any replied content from the email based on at least one of known delimiters for separating original and reply emails, known email thread patterns, and user specific email thread patterns;

analyzing the email to locate any generated signature patterns for the sender, any known signature patterns, and any user specific signature patterns, and removing any signature content from the email based on any of the located generated signature patterns for the sender, any of the located known signature patterns, and any of the located user specific signatures;

analyzing the email to locate any generated greeting patterns for the recipient, any known greeting patterns, and any user specific greeting patterns, and removing any greeting content from the email based on any of the located generated greeting patterns for the recipient, any of the located known greeting patterns, and any of the located user specific greetings;

removing any sent from content identifying a device or an email client from which the email was sent based on known sent from content; and outputting remaining email text for further processing;

wherein said further processing comprises:

analyzing the remaining email text for use in augmenting a sender's implicit profile by deriving key words from the remaining email text and storing the key words as a part of the sender's implicit profile, the sender's implicit profile being located in a recommendation engine database; and analyzing the remaining email text for question and answer content on specific topics and storing the question and answer content in the recommendation engine database.

32. The system in accordance with claim 31, wherein the email accumulation software application is running on an email source comprising at least one of a computer, a tablet computer, a laptop computer, a smartphone, an email server, an Internet enabled device, a corporate email database, an email client, and a user specific email account from an email provider.

* * * * *